United States Patent Office 3,642,882
Patented Feb. 15, 1972

3,642,882
PROCESS FOR THE PRODUCTION OF NITRO-ARYLETHERMONOCARBOXYLIC ACIDS AND THEIR ESTERS
Heinrich Gilch, Krefeld, Gerhard Darsow, Krefeld-Uerdingen, Ludwig Bottenbruch, Krefeld-Bockum, Günter Lorenz, Hans Egon Künzel, and Günther Nischk, Dormagen, and Hermann Schnell, Krefeld-Uerdingen, Germany, assignors to Farbenfabriken Bayer Aktiengesellschaft, Leverkusen, Germany
No Drawing. Filed July 22, 1968, Ser. No. 746,257
Claims priority, application Germany, July 28, 1967, F 53,088; June 7, 1968, P 17 68 619.0
Int. Cl. C07c 79/46
U.S. Cl. 260—520     6 Claims

ABSTRACT OF THE DISCLOSURE

Nitroaryl ether monocarboxylic acids and their esters and a process for producing them by reacting (A)

(1) a dialkali metal salt of a m- or p-hydroxy aryl carboxylic acid or
(2) monoalkali metal salt of a m- or p-hydroxy aryl carboxylic acid ester with (B)

an aromatic mononitro-halo-substituted compound wherein the halogen atom or atoms and nitro substituent are ring attached;

and effecting the reaction at an elevated temperature utilizing molar amounts of the reactants at 50–160° C. in the presence of a strongly polar organic solvent.

---

The invention relates to nitroarylether-monocarboxylic acids and their esters and to a technically advantageous process for the production thereof.

As stated by C. Häussermann and E. Bauer in "Berichte" 29, page 2084 (1896), p-nitrophenylether-p-hydroxybenzoic acid is obtained by introducing dipotassium-p-hydroxybenzoate into a multiple excess of p-nitrochlorobenzene at 160° C. and heating the heterogeneous mixture at 235° C. for about 6 hours.

The object of the invention comprises a process for the production of nitroarylether-monocarboxylic acids and their esters by reacting dialkali metal salts of m- or p-hydroxyarylcarboxylic acids or monoalkali metal salts of m- or p-hydroxyarylcarboxylic acid esters with aromatic mononitro-halogen compounds in which the halogen atom or atoms and the nitro group are attached to the same aromatic ring, at an elevated temperature, said process being characterised in that molar amounts of the reaction components are reacted in the presence of a strongly polar organic solvent at temperatures between about 50° C. and about 160° C., preferably between about 110° C. and 140° C.

By this process nitroarylether-monocarboxylic acids and their esters of the following formula are produced

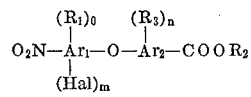

wherein
the ether group is attached in the o- or p-position to the nitro group and
$Ar_1$ and $Ar_2$ are mononuclear or anellate or condensed polynuclear aromatic radicals, $R_1$ is hydrogen or an alkyl radical having 1 to 4 carbon atoms, an alkoxy radical having 1 to 4 carbon atoms, the hydroxyl group or an amino group,
$R_2$ is hydrogen or an alkyl having 1 to 4 carbon atoms, a cyclo alkyl group or an aryl group,
$R_3$ is hydrogen or an alkyl group having 1 to 4 carbon atoms, an alkoxy group having 1 to 4 carbon atoms or a halogen atom,
$o$ is a whole number from 1 to 4,
$m$ is 0, 1 or 2,
$n$ is a whole number from 1 to 4, and
$o+m$ is 4.

The aromatic nitrohalogen compounds used are preferably the chlorine compounds; however, the fluorine, bromine and iodine derivatives can also be reacted.

In the case of mono-halogen compounds, the meta-compounds are less reactive than the ortho- and para-compounds, and the yields of nitroarylether-monocarboxylic acids or their esters obtained with the meta-compounds are therefore lower. Suitable nitromonohalogen compounds are, for example, the m- and especially the o- and p-nitrohalobenzenes, further 2-nitro-2-, -4-, -5- and -6-halodiphenyl, 3-nitro-2-, -4-, -5- and -6-halodiphenyl, 4-nitro-2- and -3-halodiphenyl, 1-nitro-2-, -3- and -4-halonaphthalene and 2-nitro-1-, -3- and -4-halonaphthalene.

In the case of di- and trihalogen compounds thhe halogen atoms and the nitro group of which are attached to the same aromatic nucleus, one halogen atom msut be attached in the o- or p-position to the nitro groups and a second and a third halogen atom respectively must be attached in the m-position to the nitro group.

Suitable compounds of this kind are, for example, 2,3-dichloro-1-nitrobenzene,
3,4-dichloro-1-nitrobenzene,
4-chloro-3,5-diiodo-1-nitrobenzene,
4-iodine-3,5-dichloro-1-nitrobenzene,
4-bromo-3,5-diiodo-1-nitrobenzene,
2,3-dichloro-4-methyl-1-nitrobenzene,
3,4-dichloro-5-hydroxy-1-nitrobenzene,
3,4-dichloro-5-methoxy-1-nitrobenzene,
2,3,5-trichloro-6-hydroxy-1-nitrobenzene,
2,5-dichloro-4-nitroaniline and
3,4-dichloro-1-nitronaphthalene.

Suitable hydroxyaryl-monocarboxylic acids are, for example, m- and p-hydroxybenzoic acid, its alkyl-substitution products, such as 3-hydroxy-4-methylbenzoic acid, 4-hydroxy-2- and -3-methylbenzoic acid and 5-hydroxy-2-ethylbenzoic acid and 5-hydroxy-2,4-dimethylbenzoic acid, its alkoxy-substitution products, such as 4-hydroxy-3-methoxybenzoic acid and 5-hydroxy-2-methoxy-3-methylbenzoic acid, and its halo-substitution products in which the halogen stands in the m- or o-position to the carboxyl group, such as 3-hydroxy-4-chlorobenzoic acid and 4-hydroxy-3-chlorobenzoic acid. Examples of polynuclear hydroxyaryl-carboxylic acids are 4-hydroxy-4'-carboxydiphenyl, 4-hydroxy-3'-carboxydiphenyl, 4-hydroxy-4'-carboxydiphenyl ether, 5 - hydroxy - 1 - carboxynaphthalene, 3-,4-,5-,6- and 7-hydroxynaphthoicacid-(1) and 4-,5-,6-,7-, and 8-hydroxynaphthoicacid-(2).

Suitable hydroxyaryl-carboxylic acid esters are those of the aforesaid hydroxyaryl-carboxylic acids and aliphatic alcohols, such as methanol, ethanol, propanol, butanol, isobutanol and the like, and aromatic monohydroxy compounds, such as phenol, the cresols and the like.

Suitable cations for the hydroxycarboxylic acid salts are those of all metals of the first main group of the Periodic System. However, the sodium and potassium salts are preferred.

Examples of suitable polar organic solvents are diethyl sulphoxide, dimethylsulphone, diethylsulphone, diisopropylsulphone and tetramethylsulphone, and primarily dimethyl sulphoxide (DMSO).

It is not necessary to prepare first the alkali metal salt of the hydroxycarboxylic acid or its ester and to use it in the anhydrous solid form; the salt formation and the condensation reaction with the nitrohalogen compound in the presence of the polar solvent may be carried out successively or simultaneously.

For this purpose, molar amounts of the hydroxyarylcarboxylic acid or the ester and of the nitrohalogen compound are dissolved in a sufficient amount of the polar solvent, the stoichiometric amount of alkali metal hydroxide is added in solid form or in an aqueous solution, and the mixture is gradually heated to the reaction temperature under an inert gas, for example, nitrogen. Depending upon the reaction temperature and the water content of the mixture, the reaction time then amounts to about ½–6 hours. After cooling, the solution is mixed with acidified water, whereupon the reaction product is precipitated in solid form and can be separated. Impurities can be removed, if desired, by washing, reprecipitation or recrystallisation from a suitable solvent.

To attain high yields, however, it is more advantageous to maintain a low water content of the reaction mixture during the condensation of the alkali metal salt of the hydroxycarboxylic acid or the ester with the nitrohalogen compound. To this effect, the hydroxycarboxylic acid or its ester is dissolved in a sufficient amount of the strongly polar organic solvent, the stoichiometric amount of alkali metal hydroxide or alcoholate is added in solid form or an in aqueous or alcoholic solution, and the mixture is heated under an inert gas at about 110° C. to about 140° C. for some time, e.g. 2–6 hours, while the water which is present or is eliminated by the salt formation or the alcohol is substantially distilled off from the mixture, expediently with the use of a carrier, such as benzene or toluene. Since the addition of a carrier reduces the solubility of the alkali metal salts in the polar solvent, the carrier should be distilled off before the condensation reaction. The nitrohalogen compound is then added, whereupon condensation sets in.

Another simple method of substantially removing the water or alcohol from the reaction mixture consists in mixing the hydroxycarboxylic acid or the ester, the alkali metal hydroxide or alcoholate, optionally in an aqueous or alcoholic solution, the polar solvent and the nitrohalogen compound, and distilling off about 10–20% by volume of the polar solvent in a vacuum at the beginning of the condensation reaction. The water or alcohol is then distilled off from the reaction mixture azeotropically with the partial amount of the polar solvent.

The nitroarylether-monocarboxylic acids and their esters are valuable intermediates for the production of, for example, the corresponding aminoarylether-carboxylic acids and their esters by reducing the nitro group by known methods, and said aminoarylether-carboxylic acids and esters, in turn, can be used for the production of polyamide plastics by self-polycondensation under splitting off of water and of the corresponding hydroxy compound respectively according to methods known in the art of manufacturing of high molecular weight polyamides. Such polyamides derived from halogen free intermediates are, in general, not soluble in common organic solvents but rather can be moulded from the melt. On the other hand, polyamides derived from halogen containing intermediates are highly soluble in, for example, dimethylacetamide and N-methylpyrrolidone and from such solutions films may be cast and fibres may be spun.

Further, halogen containing nitroarylether-monocarboxylic acids and their esters have fungicidizing, herbicidizing and bactericidizing effects and may be used as crop protective agents. For example, 4'-nitro-2'-chloro-diphenylether-carboxylic acid-(4) and -(3) (see following Examples 8 and 9) are fungicides against fusicladium dendr. in amounts of 0.0005% by weight in vitro. Plants are not striked. 4-nitro-2,2'-dichloro-diphenylether-carboxylic acid-(4) (see the following Example 11) may be used as aqueous solutions as seed steep. 100 mg. of this product pro 1 kilo seed grain prevents bunt of wheat. The acylated aminocarboxylic acid of the formula

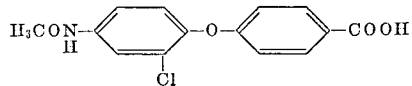

is a valuable herbicide for millet, turnip, red beet, carrot, beet-sugar, mustard and cotton plants.

EXAMPLE 1

4'-nitro-diphenylether-carboxylic acid-(3)

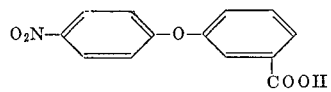

138.1 g. (1 mole) m-hydroxybenzoic acid and 157.6 (1 mole) p-chloronitrobenzene are placed in a glass flask of 1 litre capacity and dissolved in 600 ml. dimethyl sulphoxide (DMSO). The glass flask is fitted with a gas feed tube, a stirrer, a thermometer and a reflux condenser. A slow nitrogen current is then passed through the apparatus in order to generate an inert gas atmosphere. 80.0 g. (2 moles) sodium hydroxide are added in the form of tablets and the reaction mixture so obtained is heated at 120° C. for 6 hours. The reaction product is then introduced into 5 litres of water, whereupon a yellow-brown solution is formed. The cold solution is filtered and acidified with dilute sulphuric acid. The slight yellow precipitate which separates is filtered off, washed with water until neutral and dried. The yield of 4'-nitro-diphenylether-carboxylic acid-(3)- amounts to 239 g. or 92.5% of theory. After recrystallisation from hot alcohol, colourless crystals of M.P. 188° C. are obtained.

EXAMPLE 2

2'-niro-diphenylether-carboxylic acid-(3)

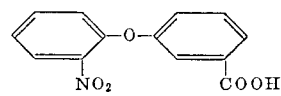

80.0 g. (2 moles) sodium hydroxide and 138.1 (1 mole) m-hydroxybenzoic acid are dissolved in 500 ml. DMSO in an apparatus according to Example 1 by heating under a nitrogen atmosphere. 157.6 g. (1 mole) o-chloronitrobenzene are added to the solution while it is still warm. The reaction mixture so obtained is heated at 140° C. for 6 hours. Working up of the crude product is carried out as in Example 1. The yield of 2'-nitro-diphenylether-carboxylic acid-(3) amounts to 234 g. or 90.5% of theory. The crystals obtained after recrystallisation have melting point 159–160° C.

EXAMPLE 3

4'-nitro-diphenylether-carboxylic acid-(4)

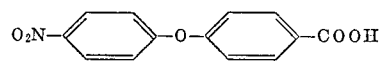

80.0 g. (2 moles) sodium hydroxide, dissolved in 80 ml. of water, and 138.1 g. (1 mole) p-hydroxybenzoic acid as well as 157.6 g. (1 mole) p-chloronitrobenzene, dissolved in 600 ml. DMSO, are introduced into a glass flask fitted with stirrer, thermometer, boiling capillary and distillation bridge. Nitrogen is blow through the apparatus, and 100 ml. DMSO and water are then distilled off in a vacuum while stirring. The reaction mixture is subsequently heated under normal pressure at 130° C. for 2 hours and then diluted with 5 litres of water. The resultant solution is filtered and acidified with dilute sulphuric acid. The whitish precipitate which separates is filtered off with suction, washed with water until neutral, rinsed with methanol, and dried. The yield of 4'-nitrodiphenylether-carboxylic acid-(4) amounts to 248 g. or 96% of theory. After recrystallisation from hot alcohol, colourless crystals of M.P. 234° C. are obtained.

EXAMPLE 4

2'-nitro-diphenylether-carboxylic acid-(4)

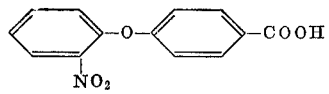

129.1 g. (2 moles) of a 86.9% potassium hydroxide solution and 138.1 g. (1 mole) p-hydroxybenzoic acid are dissolved under a nitrogen atmosphere in 600 ml. DMSO in an apparatus according to Example 1 which is fitted, in addition, with a water receiver filled with toluene. 100 ml. toluene are subsequently added. The reaction mixture so obtained is heated at 140° C. for 4 hours, and the water contained in the mixture and resulting from the salt formation is continuously distilled off azeotropically with toluene. When the water has been completely removed from the mixture, the toluene is distilled off and 157.6 g. (1 mole) o-chloronitrobenzene are added to the solution while it is still warm. The mixture is heated at 130° C. for 2 hours and then allowed to cool. Working up of the crude product is carried out as in Example 1. The yield of 2'-nitro-diphenylether-carboxylic acid-(4) amounts to 243 g. or 94% of theory. The recrystallised substance melts at 182–183° C.

EXAMPLE 5

23 g. sodium are dissolved in 500 ml. of anhydrous methanol and introduced in small portions into 152 g. p-hydroxybenzoic acid methyl ester. About 400 ml. methanol are distilled off and after the addition of 300 ml. toluene, the methanol is quantitatively removed. A solution of 157.5 g. p-nitrochlorobenzene in 300 ml. dimethyl sulphoxide is added dropwise with stirring and the mixture is kept under reflux. After 3 hours, the solution shows a neutral reaction. The sodium chloride formed is filtered off and washed with toluene. The solutions are combined and concentrated, and the residue is recrystallised from methanol. Yield: 221 g. 4'-nitrodiphenylether-carboxylic acid-methyl ester-(4), M.P. 108–110° C.

Analysis.—Calculated (percent): 61.5 C; 4.0 H; 29.3 O; 5.1 N. Found (percent): 61.7 C; 4.2 H; 20.2 O; 5.1 N.

EXAMPLE 6

The procedure of Example 5 is followed, but the sodium methylate in methanol is replaced with a solution of 40 g. sodium hydroxide in 70 ml. of water. The water is distilled off azeotropically with the toluene. Yield 205 g.

EXAMPLE 7

4'-nitro-2-chloro-diphenylether-carboxylic-acid-(4)

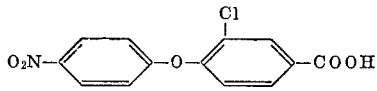

380 parts by weight of 3-chloro-4-hydroxybenzoic acid are dissolved in 2000 parts by volume DMSO. 284 parts by weight of KOH (88%) dissolved in 200 parts by volume of water, are added, and about 450 parts by volume of water and DMSO are distilled off in vacuum. 315 parts by weight of p-nitrochlorobenzene are added and the mixture is heated at 110° C. for 15 hours. The solution is then poured into about 5000 parts by volume of water. 4'-nitro-2-chloro-diphenylether-carboxylicacid-(4) is precipitated with dilute sulfuric acid and after suction recrystallised from 2000 parts by volume of glacial acetic acid. Yield: 405 parts by weight=69% of the theory. Melting point: 170–72° C.

Analysis.—$C_{13}H_8ClNO_5$ (293.7). Calculated (percent): C, 53.17; H, 2.74; Cl, 12.07; N, 4.77. Found (percent): C, 53.10; H, 2.80; C, 12.10; N, 4.70.

EXAMPLE 8

4'-nitro-2'-chloro-diphenylether-carboxylicacid-(4)

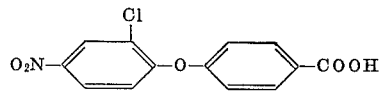

276 parts by weight of p-hydroxy-benzoic acid and 326 parts by weight of concentrated sodium hydroxide solution (49.1% NaOH) are added to 3000 parts by volume dimethylsulphoxide (DMSO). The mixture is heated to 70° C. and 365 parts by weight of mononitro-3,4-dichlorobenzene are added. After stirring at 110° C. for 3½ hours the solvent is distilled off in a vacuum and the residue is dissolved in 3000 parts by volume of water. The solution is then stirred with active carbon and acidified after filtration. The resulting precipitate is filtered off with suction, washed and recrystallised while wet from 3900 parts by volume of glacial acetic acid with the addition of active carbon. There are obtained 416 parts by weight=71% of the theory 4'-nitro-2'-chloro-diphenylether-carboxylicacid-(4) of the melting point 198–200° C.

Analysis.—$C_{13}H_8ClNO_5$ (293.7). Calculated (percent): C, 53.17 H, 2.74; Cl, 12.07; N, 4.77. Found (percent): C, 53.15; H, 2.80; Cl, 12.10; N, 4.70.

EXAMPLE 9

4'-nitro-2'-chloro-diphenylether-carboxylicacid-(3)

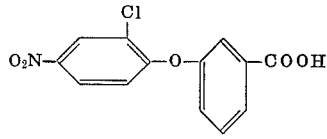

When using 290 parts by weight m-hydroxybenzoicacid instead of p-hydroxybenzoicacid as in Example 8, there are obtained 379 parts by weight=64% of the theory 4'-nitro - 2' - chloro-diphenylether-carboxylicacid-(3) of the melting point 172–174° C.

Analysis.—$C_{13}H_8ClNO_5$ (293.7). Calculated (percent): C, 53.17; H, 2.74; Cl, 12.07; N, 4.77. Found (percent): C, 52.90; H, 2.90; Cl, 12.10; N, 4.80.

EXAMPLE 10

2'-nitro-6'-chloro-diphenylether-carboxylicacid-(3)

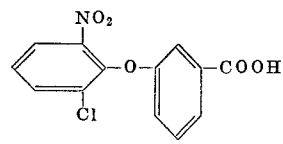

145 parts by weight of m-hydroxybenzoic acid and 135 parts by weight of potassium hydroxide (86.5% KOH) are added to 1700 parts by volume DMSO, 200 parts by volume DMSO are distilled off in a vacuum and 192 parts by weight of mononitro-2,3-dichlorobenzene are added to the worm solution. The temperature of the reaction mixture rises to 130° C. The solvent is then distilled off in a vacuum. The residue is taken up with 1000 parts by volume of water and filtered with the addition of active carbon. The filtrate is acidified with concentrated hydrochloric acid and the resulting precipitate recrystallised from glacial acetic acid after filtering with suction and washing with water. There are obtained 230 parts by weight=79% of the theory of 2'-nitro-6'-chloro-diphenylether-carboxylic-acid-(3) of the melting point 210–212° C.

Analysis.—$C_{13}H_8ClNO_5$ (293.7). Calculated (percent): C, 53.17; H, 2.74; Cl, 12.07; N, 4.77. Found (percent): C, 53.00; H, 2.80; Cl, 12.20; N, 4.80.

EXAMPLE 11

4'-nitro-2,2'-dichloro-diphenylether-carboxylicacid-(4)

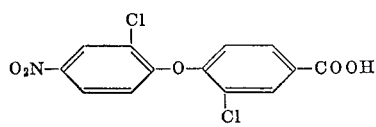

380 parts by weight of 3-chloro-4-hydroxybenzoic acid are dissolved in 2000 parts of volume DMSO. 284 parts by weight of potassium hydroxide (88%) dissolved in 200 parts by volume of water are added and about 450 parts by volume of water and DMSO are distilled off in a vacuum, 384 parts by weight of mononitro-3,4-dichlorobenzene are added and the mixture is heated at 110° C. for 15 hours. The solution is subsequentoly poured into about 5000 parts by volume of water. The 4'-nitro-2,2'-dichlorodiphenylether-carboxylicacid-(4) is precipitated with dilute sulfuric acid and after suction recrystallised from 2000 parts by volume of glacial acetic acid. Yield: 425 parts by weight=65% of the theory.

Analysis.—$C_{13}H_7Cl_2NO_5$ (328.1). Calculated (percent): C, 47.59; H, 2.15; Cl, 21.61; N, 4.27. Found (percent): C, 47.65; H, 2.25; Cl, 21.70; N, 4.35.

EXAMPLE 12

2-nitro-4,6-dichloro-diphenylether-carboxylicacid-(4')

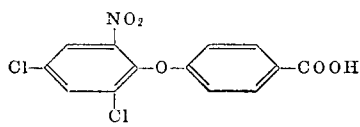

226 parts by weight of 2,3,5-trichloro-1-nitrobenzene are added at 70° C. to a mixture of 1800 parts by volume of dimethylsulphoxide, 145 parts by weight of 4-hydroxybenzoic-acid and 135 parts by weight of potassium hydroxide and the mixture is stirred for 1 hour at 120° C. The further process results as in Example 4. There are obtained 265 parts by weight=81% of the theory of 2-nitro-4,6-dichloro-diphenylether-carboxylicacid-(4') of the melting point 201–203° C.

Analysis.—$C_{13}H_7Cl_2NO_5$ (328.1). Calculated (percent): C, 47.59; H, 2.15; Cl, 21.61; N, 4.27. Found (percent): C, 47.50; H, 2.40; Cl, 21.60; N, 4.14.

We claim:

1. A compound of the formula

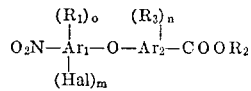

wherein the

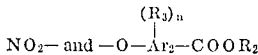

groups are in the o- or p-position with respect to each other; Hal is halogen; $Ar_1$ and $Ar_2$ are phenylene, diphenylene or naphthylene; $R_1$ is hydrogen, methyl, methoxy, hydroxy or amino; $R_2$ is hydrogen, alkyl having from 1 to 4 carbon atoms, phenyl or cresyl; $R_3$ is hydrogen, methyl, ethyl, methoxy or halogen; $m$ is 1 or 2; $n$ is 4 and $o$ is 2 or 3 and $o+m$ is 4.

2. The compound of claim 1 wherein each of $Ar_1$ and $Ar_2$ is phenylene; $R_1$, $R_2$ and $R_3$ are each hyrogen; Hal is chlorine; $m$ is 1 and $o$ is 3.

3. The compound of claim 1 wherein each of $Ar_1$ and $Ar_2$ is phenylene; $R_1$, $R_2$ and $R_3$ are each hydrogen; Hal is chlorine; $m$ is 2 and $o$ is 2.

4. A process for producing a compound of the formula

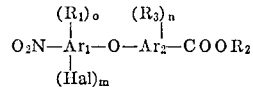

wherein the

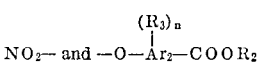

groups are in the o- or p-position with respect to each other; Hal is halogen; $Ar_1$ and $Ar_2$ are phenylene, diphenylene, or naphthylene; $R_1$ is hydrogen, methyl, methoxy, hydroxy or amino; $R_2$ is hydrogen, alkyl having from 1 to 4 carbon atoms, phenyl or cresyl; $R_3$ is hydrogen, methyl, ethyl, methoxy or halogen; $m$ is 1 or 2; $n$ is 4 and $o$ is 2 or 3 and $o+m$ is 4, said process comprising reacting a substantially equimolar amount of (A) a dialkali meal salt or a monoalkali metal salt of a compound of the formula

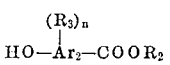

wherein the —OH and —$COOR_2$ moieties are in m- or p-position with respect to each other and $Ar_2$, $R_2$, $R_3$ and $n$ are as aforesaid and (B) a compound of the formula

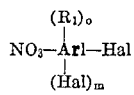

wherein Hal, $o$ and $Ar_1$ are as aforesaid in the presence of a solvent selected from the group consisting of dimethyl sulphoxide, diethyl sulphoxide, dimethylsulphone, diethylsulphone, diisopropylsulphone and tetramethylsulphone at a temperature between about 50 and about 160° C. and recovering resulting reaction product.

5. The process of claim 4 wherein said temperature is between about 110 and about 140° C.

6. The process of claim 4 wherein said reaction is carried out in the absence of water.

References Cited

UNITED STATES PATENTS 3,423,470    1/1969    Rohr et al. _____ 260—520

LORRAINE A. WEINBERGER, Primary Examiner

L. A. THAXTON, Assistant Examiner

U.S. Cl. X.R.

71—111, 116; 260—471 R, 519, 999